W. R. DOWN.
DRILL.
APPLICATION FILED FEB. 17, 1912.
1,027,039.
Patented May 21, 1912.
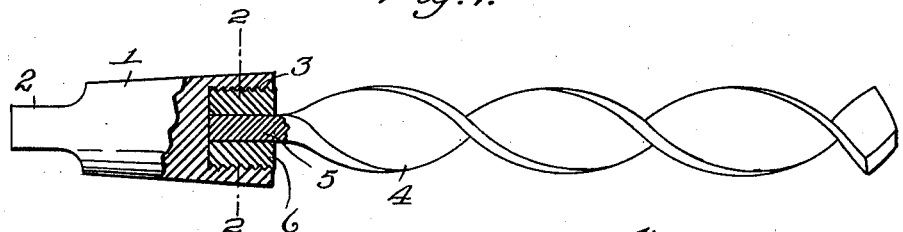
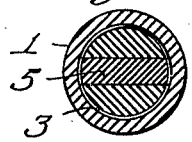
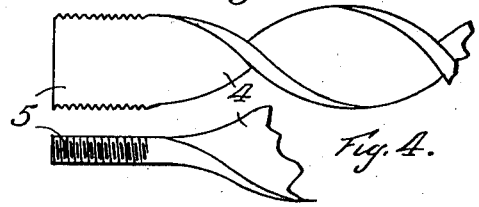
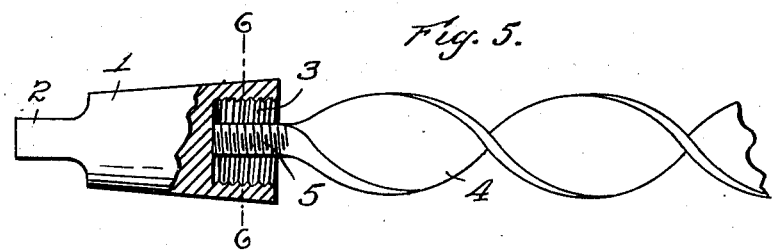
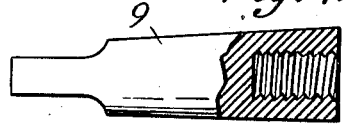
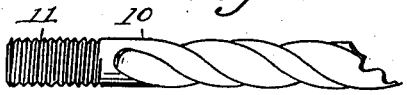
WILLIAM R. DOWN, Inventor
Witnesses
J. O. R. Kelly.
N. N. Moore,
Attorney

UNITED STATES PATENT OFFICE.

WILLIAM R. DOWN, OF READING, PENNSYLVANIA.

DRILL.

1,027,039.  Specification of Letters Patent.  Patented May 21, 1912.

Application filed February 17, 1912.  Serial No. 678,314.

*To all whom it may concern:*

Be it known that I, WILLIAM R. DOWN, citizen of the United States, residing at Reading, in the county of Berks and State of Pennsylvania, have invented certain new and useful Improvements in Drills, of which the following is a specification.

This invention relates to improvements in drills and the object of the present invention is to provide a drill with means for securing it in a socket in such manner that it may readily be removed from the socket when worn out or broken, and replaced by a new one, utilizing the same socket for an indefinite number of drills.

A further object is to utilize substantially the entire portion of the drill by making the shank merely long enough for engagement by the socket. I accomplish this purpose by means of an internally screw-threaded socket adapted to receive the screw-threaded end or shank of the drill, and in cases where a flat shank is used, I supply filling blocks, which, together with the drill shank, screw into the socket, although in some cases, even with a flat shank, these blocks are not necessary.

The invention is more fully described in the following specification and clearly illustrated in the accompanying drawing, in which:—

Figure 1 is an elevation of my drill, partly in section. Fig. 2 is a section through 2—2 of Fig. 1. Fig. 3 shows the side of the shank of a flat drill. Fig. 4 shows the edge of the shank shown in Fig. 3. Fig. 5 shows a flat drill in the socket without the filling blocks. Fig. 6 is a section through 6—6 of Fig. 5. Fig. 7 shows, partly in section, a screw-threaded socket and Fig. 8 the shank end of a straight shank drill.

The numeral 1 designates a socket provided with a reduced flat end 2 for engagement with a chuck. The large end of the socket is formed with a cavity which is screw-threaded internally, 3, and adapted to receive the shank end of a drill.

The numeral 4 designates a drill, formed with a flat shank 5 and this shank is screw-threaded on its narrower edges and adapted to screw into the socket. In many cases this engagement of the drill with the socket will be sufficient to hold it securely, but, in other cases it may be necessary to provide a more rigid hold, and in such cases I provide a pair of filling blocks, 6, each of which is substantially semi-circular in cross-section, and formed on the rounded surface with screw-threads, adapted to engage the threads in the socket.

When the drill is placed in the socket, the blocks are placed on each side of the flat shank, and the three parts form a continuous thread, which will screw into the shank as one body.

When the drill is worn down, it may be removed and replaced by a new one, and with this construction I do not require a shank of any considerable length, as it is only necessary to have sufficient shank to permit engagement with the socket, thus permitting the entire drill to be used, and when used down to the shank, only this small portion of the drill becomes scrap, thus effecting a considerable saving in metal.

In Figs. 7 and 8 I have shown a socket and a drill, the latter of which is formed with a straight shank, circular in form and screw-threaded. This socket 9 is substantially the same in form as the socket in Figs. 1 and 5 and the drill 10 is fluted all the way to the shank 11 and this shank also is only of sufficient length to permit engagement in the socket, thus permitting the entire drill to be used.

It is evident that with my present construction, the drills, which are of high grade material, are almost entirely consumed, thus effecting a great saving in material, and it is also evident that with this form of shank and socket, even with the straight shank shown in Fig. 8, the drill is positively and securely held while being used, which would not be the case were it engaged directly by the chuck.

Having thus fully described my inven- tion, what I claim and desire to secure by Letters Patent is:—

The combination of a twist drill having a flat, relatively short shank, said shank being screw-threaded on its narrower edges, with a socket formed with an internally screw-threaded opening and a flattened chuck engaging portion, and a pair of filling blocks adapted to screw into the socket together with the drill shank.

In testimony whereof I affix my signature in presence of two witnesses.

WILLIAM R. DOWN.

Witnesses:
 Ed. A. Kelly,
 Clara E. Young.